UNITED STATES PATENT OFFICE.

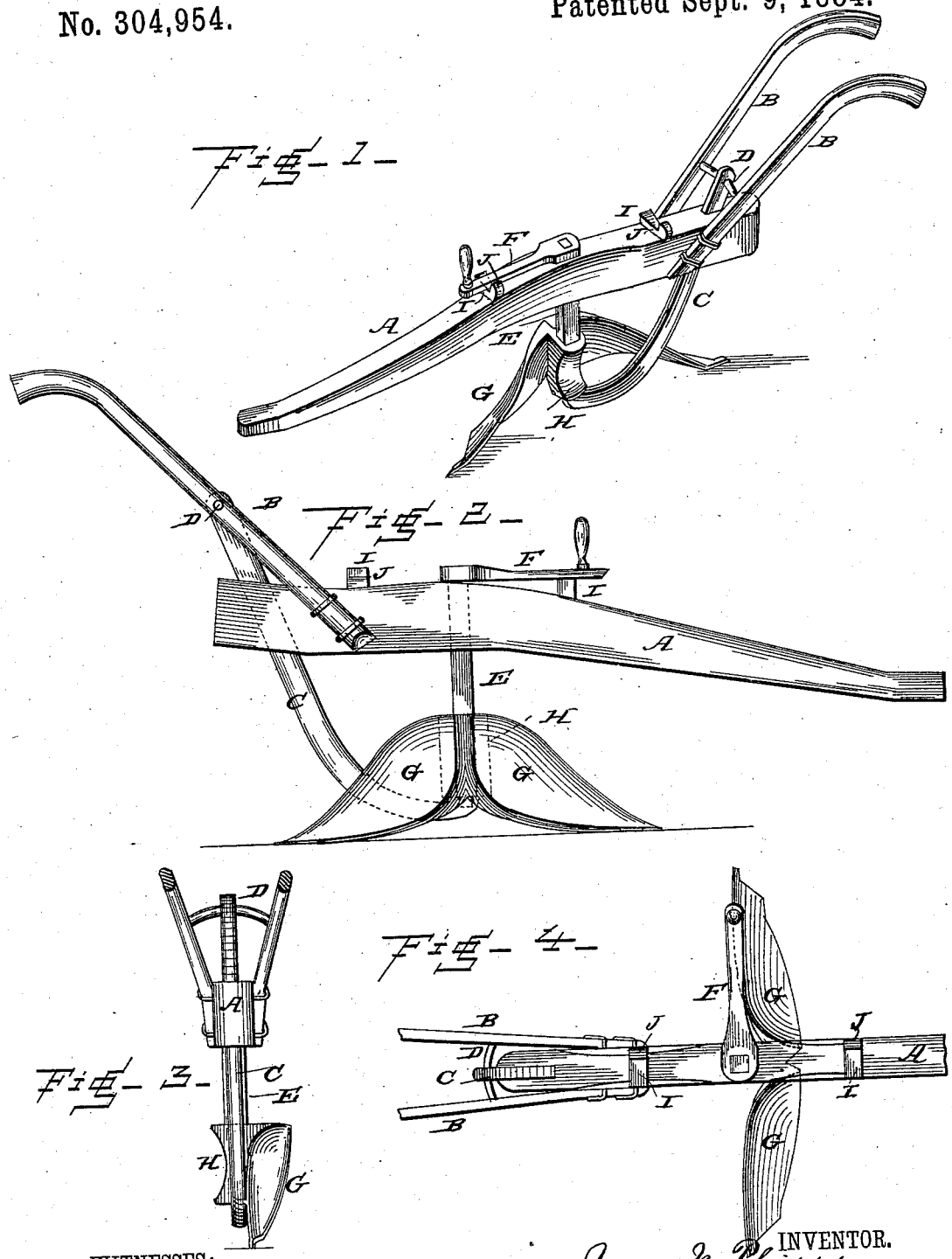

ISAAC NEWTON PHIPPS, OF WEST LIBERTY, KENTUCKY.

PLOW.

SPECIFICATION forming part of Letters Patent No. 304,954, dated September 9, 1884.

Application filed May 16, 1884. (No model.)

*To all whom it may concern:*

Be it known that I, ISAAC N. PHIPPS, a citizen of the United States and a resident of West Liberty, in the county of Morgan and State of Kentucky, have invented certain new and useful Improvements in Plows; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a plow embodying my improvements. Fig. 2 is a side view of the same. Fig. 3 is a rear view; and Fig. 4 is a plan view, showing the plow in the act of being turned or reversed.

The same letters refer to the same parts in all the figures.

My invention has relation to that class of side-hill plows in which a double mold-board is pivoted so as to be turned to either side of the standard; and it consists in the improved construction and combination of parts of a plow in which two plow-bodies connected at their ends by a boxing are pivoted so as to be turned in a horizontal plane, as hereinafter more fully described and claimed.

In the accompanying drawings, the letter A indicates the beam, which is of the usual construction, as also are the handles B B, which are secured to the rear end of the beam.

C is the standard, which passes up through the rear end of the beam, where it is provided with a round or brace, D, which passes through it and through the lower ends of the handles, and the lower end of the standard is curved forward and forms a vertical bearing for the lower end of a vertical shaft, E, polygonal in cross-section, the upper end of which shaft is pivoted in the beam, and provided above the beam with a handle or lever, F, which is preferably made of some elastic or springy material—as, for instance, steel—although a stout wooden handle may be used.

The plow-bodies G G are connected at their inner ends by means of a boxing, H, having its perforation of a shape corresponding to the size and shape of the vertical pivoted shaft, and both plow-bodies have the mold-board curved outward to the same side, so that it will be seen that one plow will throw the soil to one side and the other plow will throw it to the other side when they are reversed.

Two plates or bars, I I, having beveled catches J J at their ends, are secured upon the upper side of the beam at equal distances from the bearing for the vertical shaft, and the handle may be engaged by either of these catches as it is turned, and the plow-bodies with it, and the elasticity of the handle will allow it to be sprung inside the catches, and to be raised above them in releasing it. The plow-body pointing rearward will bear with its landside against the side of the standard, thus preventing the forwardly-pointing plow to be forced toward the furrow, and the arm and catch will hold the plow from being forced toward land, the plow thus being perfectly secure, and the sole of the rearwardly-pointing plow resting upon the bottom of the furrow, as well as the sole of the forwardly-pointing plow, the plow will have a large bearing-surface in the bottom of the furrow, as well as also have a large bearing-surface against land, and it will thus run steady and straighter than plows in which the plow-body or mold-board not in use is raised up above the ground.

I am well aware that a double mold-board pivoted at its middle and having means for reversing it and holding it in its reversed position is not broadly new in side-hill plows, and I do not wish to claim such construction; but

I claim—

The combination of the plow-beam, formed with a vertical bearing and provided with handles, the standard, having its lower end curved forward, the plow-bodies, secured together at their inner ends by means of a boxing having a polygonal perforation, the polygonal shaft, pivoted vertically to turn in the bearing in the beam and at its lower end upon the lower end of the standard, fitting into the perforation of the boxing, an elastic handle, secured upon the upper end of the vertical shaft, and the beveled catches, secured upon the upper side of the beam, adapted to engage the handle, as and for the purpose shown and set forth.

In testimony that I claim the foregoing as my own I have hereunto affixed my signature in presence of two witnesses.

ISAAC NEWTON PHIPPS.

Witnesses:
   W. W. McGUIRE,
   J. M. WALDECK.